United States Patent
Dimitriadis

(10) Patent No.: US 7,389,198 B1
(45) Date of Patent: Jun. 17, 2008

(54) LAND VEHICLE SPEED MONITORING SYSTEM

(76) Inventor: James C. Dimitriadis, 40149 Via Marisa, Murrieta, CA (US) 92562

( * ) Notice: Subject to any disclaimer, the term of this patent is extended or adjusted under 35 U.S.C. 154(b) by 0 days.

(21) Appl. No.: 11/708,385

(22) Filed: Feb. 20, 2007

Related U.S. Application Data

(60) Provisional application No. 60/816,256, filed on Jun. 26, 2006, provisional application No. 60/852,620, filed on Oct. 18, 2006.

(51) Int. Cl.
*G06F 15/00* (2006.01)
*G01P 7/00* (2006.01)

(52) U.S. Cl. ...................................... 702/142; 702/150

(58) Field of Classification Search .................. 702/94, 702/96, 142, 143, 147, 150, 187; 701/202, 701/209; 340/466, 994
See application file for complete search history.

(56) References Cited

U.S. PATENT DOCUMENTS

2005/0264404 A1* 12/2005 Franczyk et al. ........... 340/441
2006/0164259 A1* 7/2006 Winkler et al. ............. 340/944
2007/0067086 A1* 3/2007 Rothschild ................... 701/93

* cited by examiner

*Primary Examiner*—Bryan Bui
(74) *Attorney, Agent, or Firm*—Dennis W. Beeck

(57) ABSTRACT

The present invention is used for monitoring a land vehicle speed relative to a speed limit. An electronic transmit and receiver apparatus, a position location apparatus and a date and time apparatus may be positioned in the land vehicle and may be in communication with a speed and speed limit computation device. The speed and speed limit computation device may have an output to an alert display device and an output device to identify over speed limit conditions.

15 Claims, 2 Drawing Sheets

LAND VEHICLE SPEED MONITORING SYSTEM

This application claims the benefit of U.S. Provisional Application No. 60/816,256 filed Jun. 26, 2006, and U.S. Provisional Application No. 60/852,620 filed Oct. 18, 2006.

BACKGROUND OF THE INVENTION

This invention relates to systems that may be used to monitor a vehicle speed and to alert or warn a vehicle driver when they may be moving faster than a speed limit. The new speed monitoring system may detect an over speed limit condition, alert a vehicle driver of the speed, track the time for driver speed adjustment, and display and record the event.

Apparatus for detecting land vehicle speeds on roadways may be known. Most of these systems may be radar based systems. Examples may include hand held or police car mounted radar transmitter/detectors that measure a particular vehicle speed and provide a display to a user, such as a police officer. This type of apparatus does not alert drivers to over speed limit conditions and may be principally used to catch speeders for the purpose of issuing traffic tickets.

Variations of this use of radar detection may include portable roadside apparatus that may have a radar transmitter/receiver and a large display that may be seen by drivers of land vehicles. This type of apparatus may serve to inform drivers of their vehicle speed and over speed limit conditions. The apparatus may also be used by a police officer positioned in a vehicle to view the apparatus and stop speeding vehicles to issue traffic tickets.

SUMMARY OF THE INVENTION

The present invention is directed to systems for monitoring a land vehicle speed relative to a speed limit. An electronic transmit and receiver apparatus, a position location apparatus and a date and time apparatus may be positioned in the land vehicle and may be in communication with a speed and speed limit computation device. The speed and speed limit computation device may have an output to an alert display device and an output device to identify over speed limit conditions.

These and other features, aspects and advantages of the present invention will become better understood with reference to the following drawings, description and claims.

DETAILED DESCRIPTION

The following detailed description represents the best currently contemplated modes for carrying out the invention. The description is not to be taken in a limiting sense, but is made merely for the purpose of illustrating the general principles of the invention.

Figure 1:
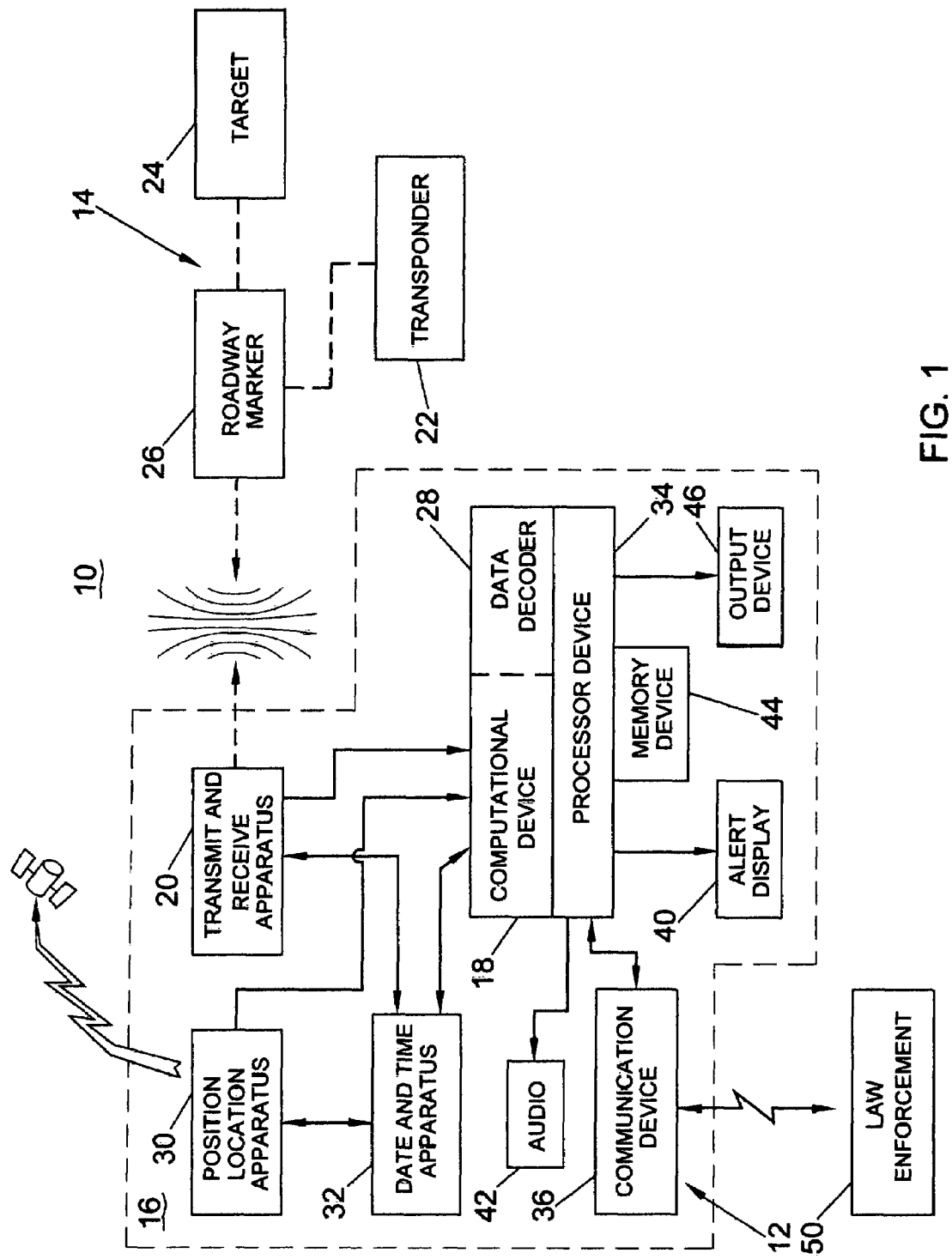
FIG. 1 illustrates a schematic diagram of a system according to an embodiment of the invention.
Figure 2:
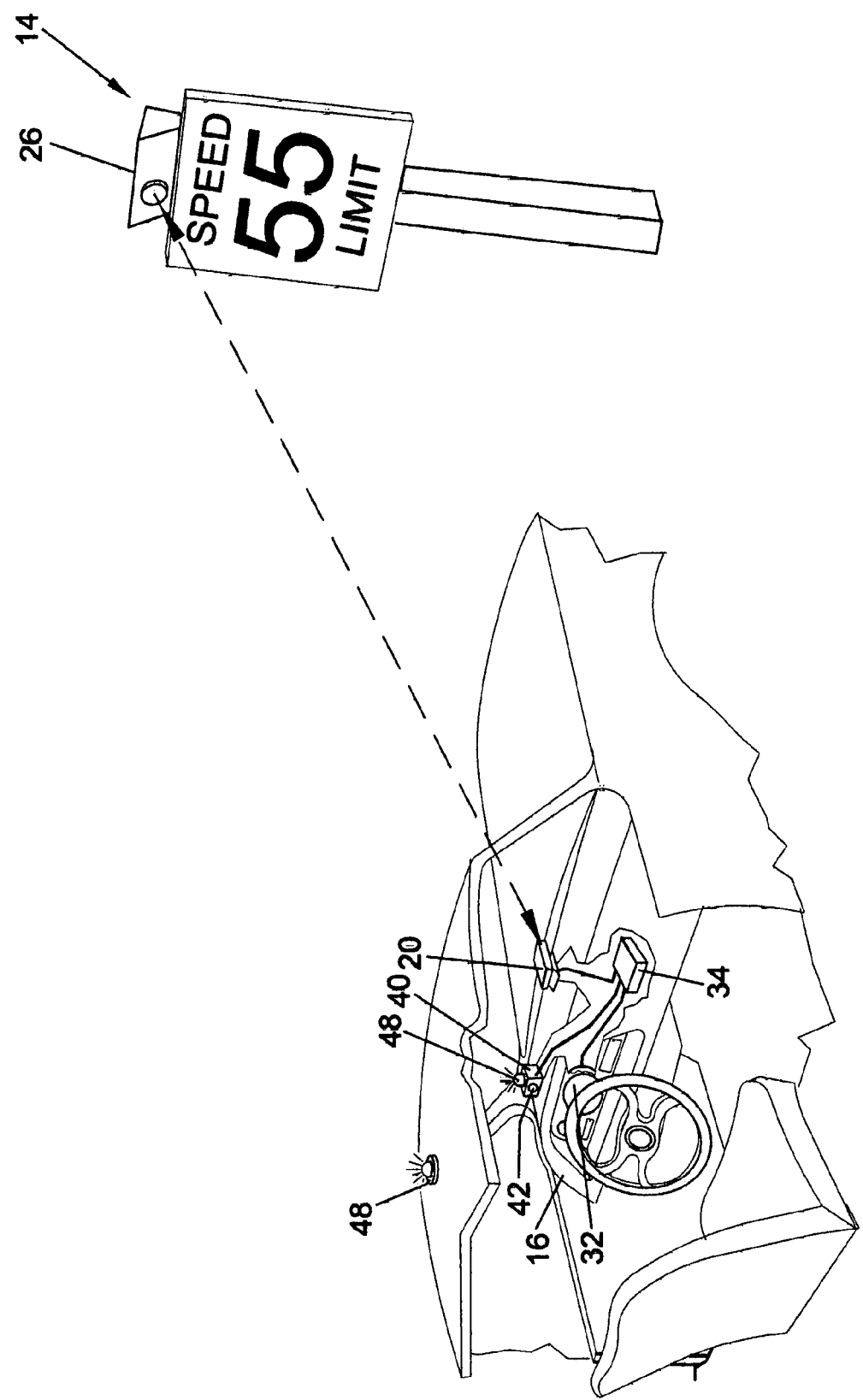
FIG. 2 illustrates a perspective view of a vehicle with monitoring elements according to an embodiment of the invention.

Referring to FIGS. 1 and 2, a land vehicle speed monitoring system 10 may have vehicle elements 12 to detect speed, monitor time and detect location. There may also be displays and recording devices. The system 10 may also have detectable markers 14 that may be detected by an electromagnetic wave signal, such as a radar signal, that may be transmitted by a vehicle element 12 for return and receiving to measure speed of a vehicle 16. Depending on the signal transmitter/receiver of a vehicle element 12 other information may be obtained, for example, a marker identification code.

The vehicle 16 may have an electromagnetic transmitting and receiving apparatus that for purposes of the disclosure may be a radar apparatus 20, but may be other suitable transmit and receive apparatus that may be used to determine speed of a vehicle 16 relative to a roadway marker 26. The radar apparatus 20 may transmit a signal that detects transponders 22 located in roadway markers 26, such as, speed limit signs, road work and school signs, accident warning signs, road hazard signs such as ice conditions, and other roadway markers 26. The vehicle elements 12 may also include detector apparatus for detecting markers 26 imbedded in roadways.

The roadway markers 26 may be passive devices or radar targets 24, or they may be powered to transmit information, such as a marker identification number, location, speed limit and other information. Transmission of information from a marker 26 may be activated by detection of a radar 20 signal or other transmitted electromagnetic signal and may be decoded in a transponder data decoder device 28.

The vehicle elements 12 may include a position location apparatus 30, such as a Global Position System or GPS receiver. There may also be a date and time apparatus 32 that may be independent or may use the GPS. In the case of the use of passive devices, the radar apparatus 20 may detect a vehicle speed at a marker 26, and the position location apparatus 30 may detect vehicle location and determine a speed limit for the location.

Whether an active transponder 22 or passive target 24 is available, the system 10 may have a speed and speed limit computation device to use the speed and speed limit detected at a particular marker 26 to determine a vehicle 16 over speed limit condition. An alert may be signaled to the vehicle 16 driver and the amount of time the vehicle 16 is in the over speed condition may be monitored by the date and time apparatus 32.

The vehicle elements 12 may include a processor device 34 that may include the speed and speed limit computation device. The processor device 34 may use the speed, speed limit and time information to determine whether a traffic ticket should be issued for a particular location for a particular vehicle 16. As an example, if a vehicle 16 may be detected as speeding, after the driver has been alerted to the condition, the processor device 34 may allow 10 seconds for correction of the over speed condition to a within speed limit condition. If the driver may not correct an overspeed condition in the time allowed, a traffic ticket may be issued.

The vehicle elements 12 may include display devices 40, audio devices 42, memory devices 44 and printers 46. There may be a display to indicate speed, speed limit, time and location. There may also be displays, such as red lights 48 exterior and interior to the vehicle. Lights may be positioned on the roof of a vehicle to indicate to others an overspeed condition and that a vehicle may be slowing. There may also be an alert light on the processor device 34 or on a dashboard for visibility for a driver. There may be an audio device on the processor device 34 or dash board to alert a driver to an over speed condition.

The same information as may be displayed and additional data may be recorded on a memory device 44. Information may also be output on a printer 46 and traffic tickets may be output on a printer 46. Law endorsement agencies 50 may be enabled to interrogate a communication device 36 of the vehicle elements 12 to determine if any tickets have been issued to a vehicle 16. A spool of paper may be used in a printer to maintain a printed record internal to the vehicle elements 12 that may be removed and replaced as needed.

Use of the system 10 may provide notice to drivers who may be speeding, allow time for correction of speed, and issue traffic tickets that are not considered traps without the need for police officers at the speeders location. This system may encourage drivers to drive at safe speeds.

While the invention has been particularly shown and described with respect to the illustrated embodiments thereof, it will be understood by those skilled in the art that the foregoing and other changes in form and details may be made therein without departing from the spirit and scope of the invention.

I claim:

1. A system for monitoring a land vehicle speed relative to a speed limit comprising:
   an electronic transmit and receive apparatus disposed in a land vehicle to detect speed relative to a roadway marker;
   a position location apparatus disposed in said land vehicles;
   a date and time apparatus disposed in said land vehicle and in communication with said electronic transmit and receive apparatus and said position location apparatus;
   a speed and speed limit computation device in communication said electronic transmit and receive apparatus, said position location apparatus, and said date and time apparatus; and in communication with an output to an alert display device and an output device.

2. The system as in claim 1 wherein a processor device is in communication with said electronic transmit and receive apparatus, said position location apparatus, and said speed and speed limit computation device.

3. The system as in claim 2 wherein a communication device is in communication said processor device and a law enforcement agency.

4. The system as in claim 1 wherein a transponder is disposed in said roadway marker.

5. The system as in claim 4 wherein said transponder having an identification data, a speed limit data and a power source.

6. The system as in claim 5 wherein said position location apparatus is a transponder data decoder device.

7. The system as in claim 1 wherein a target is disposed with said roadway marker.

8. The system as in claim 1 wherein said position location apparatus is a GPS device.

9. The system as in claim 1 wherein said alert display device is a light.

10. The system as in claim 9 wherein said light is at least two lights with a first light disposed exterior to said land vehicle and a second light disposed interior to said land vehicle.

11. The system as in claim 1 wherein said alert display device is an audio output device.

12. The system as in claim 1 wherein said alert display device is an electronic display.

13. The system as in claim 2 wherein said processor device has a memory storage device.

14. The system as in claim 1 wherein said output device is a printer.

15. The system as in claim 1 wherein said output device is a paper spool printer.

* * * * *